United States Patent
Mentl et al.

(10) Patent No.: US 10,692,189 B2
(45) Date of Patent: Jun. 23, 2020

(54) DENOISING MEDICAL IMAGES BY LEARNING SPARSE IMAGE REPRESENTATIONS WITH A DEEP UNFOLDING APPROACH USING SCAN SPECIFIC METADATA

(71) Applicant: Siemens Healthcare GmbH, Erlangen (DE)

(72) Inventors: Katrin Mentl, Lawrenceville, NJ (US); Boris Mailhe, Plainsboro, NJ (US); Mariappan S. Nadar, Plainsboro, NJ (US); Niklas Baumgarten, Karlsruhe (DE)

(73) Assignee: Siemens Healthcare GmbH, Erlangen (DE)

( * ) Notice: Subject to any disclaimer, the term of this patent is extended or adjusted under 35 U.S.C. 154(b) by 192 days.

(21) Appl. No.: 15/986,910

(22) Filed: May 23, 2018

(65) Prior Publication Data
US 2018/0268526 A1    Sep. 20, 2018

Related U.S. Application Data

(63) Continuation of application No. 15/893,891, filed on Feb. 12, 2018.
(Continued)

(51) Int. Cl.
*G06K 9/00* (2006.01)
*G06T 5/00* (2006.01)
(Continued)

(52) U.S. Cl.
CPC .............. *G06T 5/002* (2013.01); *G06N 3/08* (2013.01); *G06T 11/008* (2013.01);
(Continued)

(58) Field of Classification Search
CPC .................... G06T 5/00; G06T 11/008; G06T 2207/10081; G06T 2207/20081; G06T 2211/424; G06T 5/002; G06N 3/08
See application file for complete search history.

(56) References Cited

U.S. PATENT DOCUMENTS

| 9,734,601 B2 * | 8/2017 | Bresler ................. G06T 11/006 |
| 2015/0110381 A1 * | 4/2015 | Parvin .................. G06K 9/6249 382/133 |

(Continued)

OTHER PUBLICATIONS

Extended European Search Report dated Jun. 15, 2018 in EP Patent Application No. 18158065.5, 7 pages.
(Continued)

*Primary Examiner* — Xin Jia

(57) ABSTRACT

The present embodiments relate to denoising medical images. By way of introduction, the present embodiments described below include apparatuses and methods for machine learning sparse image representations with deep unfolding and deploying the machine learnt network to denoise medical images. Iterative thresholding is performed using a deep neural network by training each layer of the network as an iteration of an iterative shrinkage algorithm. The deep neural network is randomly initialized and trained independently with a patch-based approach to learn sparse image representations for denoising image data. The different layers of the deep neural network are unfolded into a feed-forward network trained end-to-end.

9 Claims, 13 Drawing Sheets

Related U.S. Application Data

(60) Provisional application No. 62/461,815, filed on Feb. 22, 2017.

(51) Int. Cl.
*G06N 3/08* (2006.01)
*G06T 11/00* (2006.01)

(52) U.S. Cl.
CPC ............. *G06T 2207/10081* (2013.01); *G06T 2207/20081* (2013.01); *G06T 2211/424* (2013.01)

(56) References Cited

U.S. PATENT DOCUMENTS

2017/0053402 A1* 2/2017 Migukin ............ G01R 33/5611
2017/0154413 A1* 6/2017 Yu ..................... G06K 9/6223
2017/0256068 A1* 9/2017 Wang ................. G06K 9/6244

OTHER PUBLICATIONS

Gondara, Lovedeep. "Medical image denoising using convolutional denoising autoencoders." Data Mining Workshops (ICDMW), 2016 IEEE 16th International Conference on. IEEE, 2016.

Mentl, Katrin, et al. "Noise reduction in low-dose ct using a 3D multiscale sparse denoising autoencoder." Machine Learning for Signal Processing (MLSP), 2017 IEEE 27th International Workshop on. IEEE, 2017.

David L. Donoho et al, "Adapting to Unknown Smoothness via Wavelet Shrinkage," Journal of the American Statistical Association, vol. 90, No. 432,pp. 1200-1224, 1995.

Diederik Kingma et al, "Adam: A Method for Stochastic Optimization," arXiv preprintarXiv:1412.6980, 2014.

Eric C. Ehman et al., "Methods for Clinical Evaluation of Noise Reduction Techniques in Abdominopelvic CT," RadioGraphics, vol. 34, No. 4, pp. 849-862, 2014, PMID:25019428.

Eunhee Kang, et al. "A deep convolutional neural network using directional wavelets for low-dose x-ray CT reconstruction," CoRR, vol. abs/1703.01383, 2017.

Hang Zhao, et al, "Is l2 a Good Loss Function for Neural Networks for Image Processing?," ArXiv e-prints, vol. 1511, 2015.

Harold C Burger, et al., "Image denoising: Can plain neural networks compete with BM3D?," in Computer Vision and Pattern Recognition (CVPR), 2012 IEEE Conference on IEEE, 2012, pp. 2392-2399.

Hong-Ye Gao, "Wavelet Shrinkage Denoising Using the Non-Negative Garrote," Journal of Computational and Graphical Statistics, vol. 7, No. 4, pp. 469-488, 1998.

Ingrid Daubechies, Ten Lectures of Wavelets, SIAM, 344 pages, 1992.

J.A. Fessler, "2.11—Fundamentals of CT Reconstruction in 2D and 3D," in Comprehensive Biomedical Physics, Anders Brahme, Ed., pp. 263-295. Elsevier, Oxford, 2014.

Karol Gregor and Yann LeCun, "Learning fast approximations of sparse coding," in Proceedings of the 27th International Conference on Machine Learning (ICML—10), 2010, pp. 399-406.

Kostadin Dabov, et al, "Image denoising by sparse 3-d transform-domain collaborative filtering," IEEE Transactions on Image processing, vol. 16, No. 8, pp. 2080-2095, 2007.

Leo Breiman, "Better Subset Regression Using the Nonnegative Garrote," Technometrics, vol. 37, No. 4, pp. 373-384, 1995.

Pascal Vincent, et al. "Extracting and Composing Robust Features with Denoising Autoencoders," in Proceedings of the 25th international conference on Machine learning. ACM, 2008, pp. 1096-1103.

Sonja Gordic et al., "Ultralow-dose chest computed tomography for pulmonary nodule detection: First performance evaluation of single energy scanning with spectral shaping," Investigative Radiology, vol. 14, No. 7, pp. 465-473, 2014.

Theano Development Team, "Theano: A Python framework for fast computation of mathematical expressions," arXiv e-prints, vol. abs/1605.02688, May 2016.

Yevgen Matviychuk, et al, "Learning a Multiscale Patch-Based Representation for Image Denoising in X-Ray Fluoroscopy," in Image Processing (ICIP), 2016 IEEE International Conference on IEEE, 2016, pp. 2330-2334.

Zhoubo Li, et al. "Adaptive nonlocal means filtering based on local noise level for CT denoising," Medical Physics, vol. 41, No. 1, pp. 011908-n/a,2014, 011908.

* cited by examiner

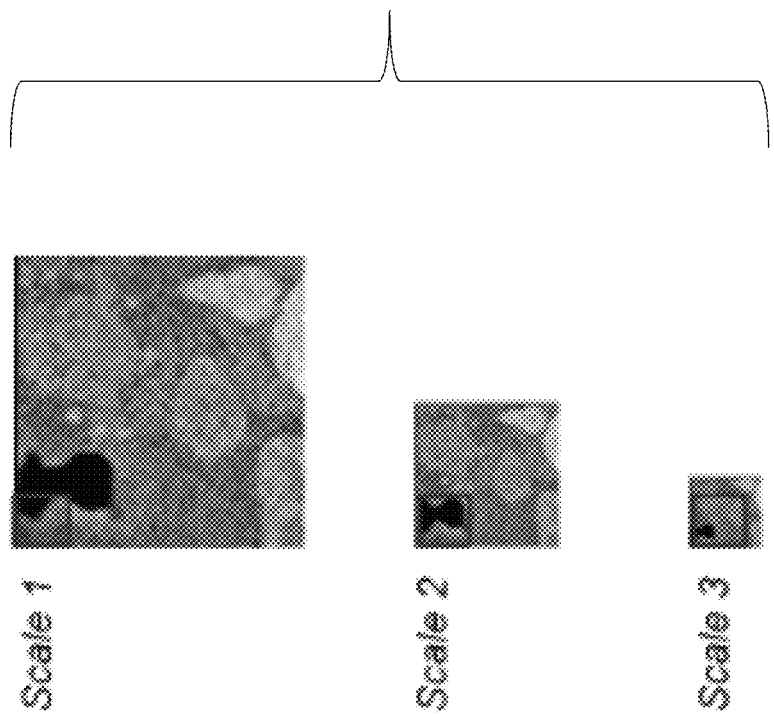

DENOISING MEDICAL IMAGES BY LEARNING SPARSE IMAGE REPRESENTATIONS WITH A DEEP UNFOLDING APPROACH USING SCAN SPECIFIC METADATA

The present patent document is a continuation of U.S. application Ser. No. 15/893,891, filed Feb. 12, 2018, and claims the benefit U.S. Provisional Application No. 62/461,815, filed on Feb. 22, 2017, therefrom, which are hereby incorporated by reference in their entireties.

BACKGROUND

In general, any image acquisition process is inevitably affected by noise. For example, in the field of X-ray imaging, reducing patient radiation exposure comes at the cost of increasing noise in the captured image. This tradeoff is especially apparent when multiple images are acquired as a time series, such as when monitoring an interventional surgery (e.g., a cardiac catheterization with X-ray fluoroscopy). When monitoring an interventional surgery, a high-quality reconstruction may be required, while providing an efficient approach to reduce varying levels of noise in near real-time. For example, to monitor a surgery in real-time, computed tomography (CT) imaging is often used. CT imaging reconstructs medical images from multiple X-ray projections through the patient at multiple orientations.

As discussed above, due to using ionizing radiation, image acquisition for CT and other x-ray imaging modalities balances a trade-off between the radiation dose and the signal-to-noise ratio of the acquired images. When low-dose radiation is employed, the acquired images may be processed to reduce noise (i.e., denoising). Various image reconstruction and denoising techniques may provide clearer and more interpretable images during the interventional surgery. For example, simple averaging filters are often used for real-time processing, however the filters lead to blurred edges and other details. Advanced algorithms have also been used to reduce signal-dependent noise (e.g., averaging spatial filters (AAS), block-matching and 3D filtering clipped (BM3Dc), etc.) and independent additive noise (e.g., adaptive variational denoising (AV), block-matching and 3D filtering (BM3D), dictionary learning (K-SVD), etc.).

For example, the BM3D algorithm achieves good image denoising results. The BM3D approach is based on providing an improved sparse image representation in a transform-domain. The sparse representation is enhanced by grouping similar 2D image fragments (e.g., image blocks) into 3D data arrays that are filtered using collaborative filtering. The result of the collaborative filtering is a 3D estimate containing jointly filtered grouped image blocks. The filtered blocks are returned to their original positions and averaging is performed over the overlapping blocks. Further extensions and improvements of the BM3D algorithm also may be used, such as the BM4D algorithm using the same approach for 3D image data.

Further, pure data-driven deep learning approaches have been deployed for denoising CT and other imaging modalities. Pure data-driven approaches, however, suffer from a lack of flexibility due to the learnt dependency to the acquisition parameters (e.g., the noise level) and deep learning often becomes too computationally expensive when applied to large 3D volumes in near real-time.

SUMMARY

The present embodiments relate to denoising medical images. By way of introduction, the present embodiments described below include apparatuses and methods for machine learning sparse image representations with deep unfolding and deploying the machine learnt network to denoise medical images. Iterative thresholding is performed using a deep neural network by training each layer of the network as an iteration of an iterative shrinkage algorithm. The deep neural network is randomly initialized and trained independently with a patch-based approach to learn sparse image representations for denoising image data. The different layers of the deep neural network are unfolded into a feed-forward network trained end-to-end. By machine learning sparse image representations with deep unfolding, computational expense may be reduced allowing for denoising images in near real-time.

In a first aspect, a method is provided for denoising medical images in a computed tomography (CT) system. The method includes scanning a patient with a CT system to generate CT image data and denoising the CT image data with an image processor by applying a deep-learnt multiscale network of filters for decomposing the CT image data into sparse image representations at multiple scales. The deep-learnt multiscale network of filters including a cascade of trained sparse denoising autoencoders, with lower levels of the deep-learnt multiscale network for applying learnt filters to image data recursively downsampled from the CT image data and the resulting denoised image data at each scale is upsampled back to full resolution and summed to obtain a final denoised image CT data set. The method also includes displaying an image rendered from the final denoised CT image data set.

In a second aspect, a method is provided for training a deep-learning based network for denoising medical images with multiscale sparse image representations. The method includes receiving a plurality of training image data sets at a first scale and downsampling the plurality of training data sets into a plurality of training image data sets at a second scale. The image processor trains a first deep neural network with the plurality of training image data sets at the first scale and a second deep neural network with the plurality of training image data sets at the second scale for collectively denoising medical images with multiscale sparse image representations. The method further includes upsampling the denoised image data obtained at the second scale back to the first scale and applies a learnt linear filter to denoised image data obtained at the first scale and the denoised image data upsampled from the second scale. A summation is performed on the filtered denoised data to obtain final denoised image data. The weights of the deep neural networks are randomly initialized during training, and the method compares the final denoised image with target image data to update the weights of the first and second deep neural networks using backpropagation. The trained deep neural networks are stored as a as a deep-learning based network.

In a third aspect, a system is provided for denoising medical images. The system includes a scanner configured to scan an image of a patient and an image processor configured to denoise the image of the patient with machine-learnt multiscale sparse image representations. The multiscale sparse image representations include layers of sparse denoising autoencoders having been trained with image data at different resolutions in an unfolded, independent feed forward network for the different resolutions. The system also includes a display configured to display the denoised image of the patient.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

FIG. 2C illustrates an image patch applied at three different scales.

DETAILED DESCRIPTION OF EXEMPLARY EMBODIMENTS

Figure 1:
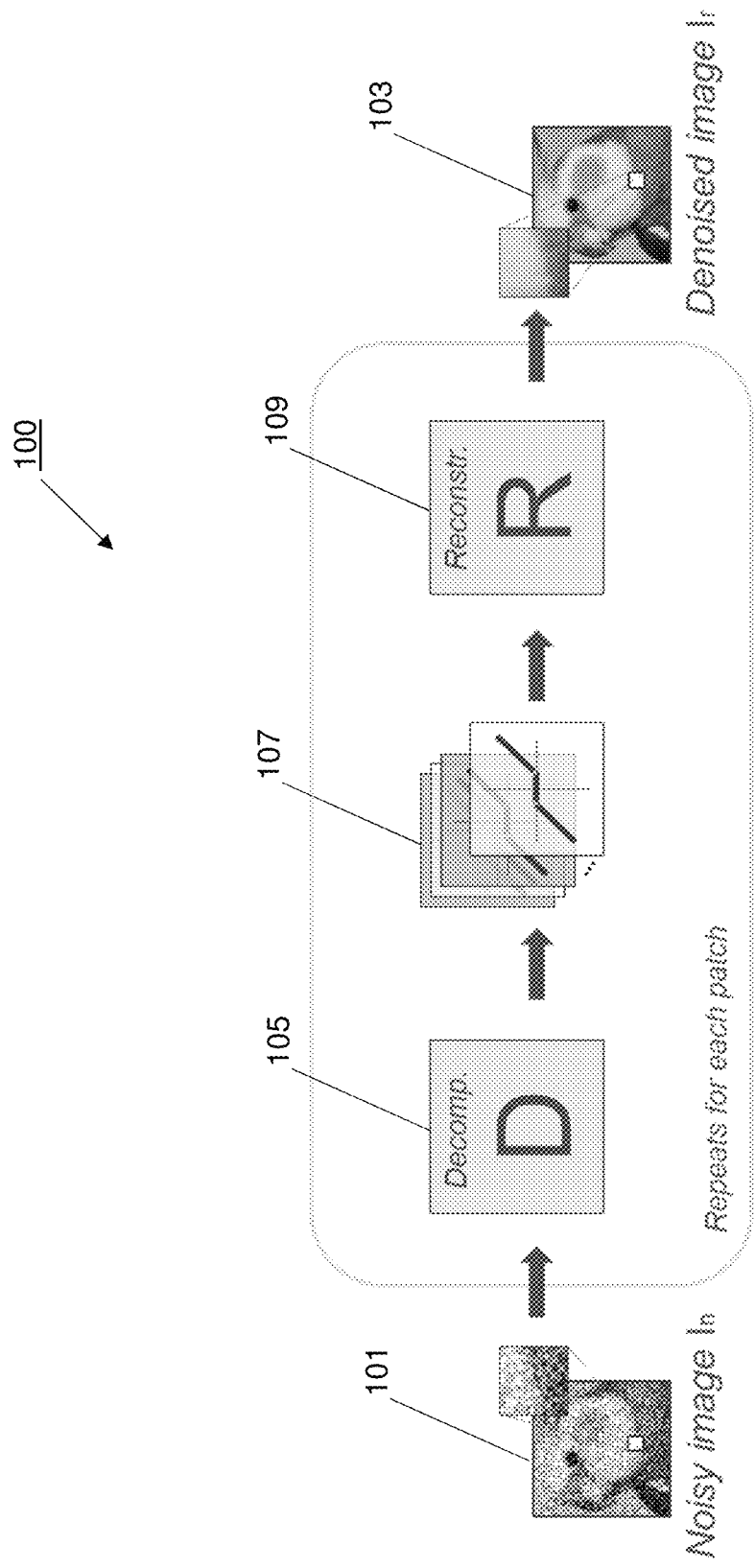
FIG. 1 illustrates an example of the sparse denoising autoencoder.

Embodiments are provided for denoising image data by machine learning sparse image representations of the image data using a deep learning and unfolding approach. Using a deep neural network, iterative thresholding is performed by unfolding a traditional shrinkage algorithm into layers of the deep neural network. Each network layer corresponds to one iteration of the iterative shrinkage algorithm, with each layer having parameters initialized and trained independently of the other layers. For example, each layer is provided as a denoising autoencoder trained on a different scale and/or resolution of the image data (i.e., multiscale autoencoders). Each layer decomposes the image data into a sparse image representation, thresholds coefficients of the sparse image representation to remove noise and reconstructs the denoised representation back into denoised image data. The different layers or iterations are unfolded into a feed-forward network of multiscale autoencoders. Each layer or scale is randomly initialized and trained independently using image patches.

Deep learning image denoising approaches, such as using the multiscale denoising autoencoders as discussed above, are based on the idea of iterative thresholding. Iterative thresholding assumes that a learned transform domain (i.e., a learned dictionary D) contains essential image information (i.e., image features) represented by a small number of high-magnitude coefficients and that noise is spread over the transform domain almost uniformly in a large number of low-magnitude coefficients. To denoise the input image dataset in the transform domain, an element-wise non-linearity shrinkage function is applied in the transform domain, setting the low-magnitude coefficients to zero. This process is repeated iteratively to generate a clean proximal mapping of the image data via a set of sparse image representations.

Traditional deep learning approaches suffer from slow convergence, making traditional approaches inapplicable for real-time applications (i.e., interventional surgical procedures and the like). Further, by initializing parameters of the Dictionary D for a given type of dataset, the training results only learn a few coefficients, preventing the trained network from fully adapting to the particular class of image datasets provided. The present embodiments provide an approach of deep learning that overcomes the drawbacks of the traditional deep learning approaches by unfolding the thresholding iterations into independently trainable and randomly initialized layers, such as using a network multiscale denoising autoencoders or another deep learning networks. Accordingly, a multiscale patch-based sparse image representation is learned and applied for denoising image data to reduce the computational expense for denoising the image data. Reducing the computational expense improves image processor speeds, allowing for real-time scanning and denoising. Further, more accurate images may be reconstructed and displayed, providing for better treatment and diagnosis with lower radiation doses used to increase patient safety.

The following description is provided with reference to denoising 3D CT volumes, however the present embodiments are equally applicable to other 2D and 3D imaging modalities. For example, applying the machine learning techniques to 2D imaging modalities processes image data slide by slide, using 2D decomposition filters. In the example 3D volumes, the sparse image representations are learned for patches of the 3D volume, using 3D decomposition filters. Using the 3D decomposition filter may provide better results by exploiting volumetric information with the trade-off of a more computationally expensive approach. Further, the denoising applications of the machine learnt network are discussed with respect to medical images (e.g., X-Ray Fluoroscopy images, 2D CT slices, 3D CT volumes, Angiography, and the like), the embodiments are equally applicable to other types of image data.

Referring to the example of a 3D CT volume, the denoising problem may be expressed as estimating a hidden image x as a function of a noisy scan y:

$$y = x + \epsilon \qquad (1)$$

where $\epsilon$ represents the noise introduced into the scan. For example, the noise $\epsilon$ is not merely white noise because a low-pass convolution kernel is applied during CT reconstruction, shaping the noise into a texture. Further, an exact statistical description of the noise in the image domain is difficult to determine because the noise is non-Gaussian in the raw measurement domain.

Thus, deep-learning-based networks are provided to solve the denoising problem, removing the noise to enhance the 3D CT image data. The network learns a sparse representation basis (i.e., a Dictionary D with image data decomposition filters) by mapping the corrupted or otherwise noisy input data to corresponding optimal features for denoising in a transform-domain. Thresholding function values for denoising in the transform-domain are adaptively learned to further reinforce network learning based on the 3D volume data. The networks are trained end-to-end from a database of real high-dose CT scans with synthetic noise introduced to simulate a corresponding low-dose scan. To capture important image features at various scales and to process large CT volumes in a reasonable time, a multiscale or layered approach is applied. The CT volume data is recursively downsampled and used with a denoising operator of a constant size for each layer and trained independently at each scale.

In various embodiments, each network layer is trained with a denoising autoencoder for the scale of the layer. Generally, a denoising autoencoder is a neural network (N) trained on image pairs (y, x) via supervised learning. The denoising autoencoder is trained to map the noisy input y into a transform domain and to reconstruct the input as close to a ground truth image x as possible by removing the noise c. The denoising autoencoder extracts features from the noisy input y as relevant to reconstruct the ground truth image x. The mapping may be expressed as:

$$\hat{x} \triangleq \mathcal{N}(y) \approx x. \qquad (2)$$

A denoising autoencoder is an example of supervised learning, where the network learns to reconstruct a noisy input with the benefit of the ground truth images (i.e., clean image). In the supervised learning approach, such as applied to the 3D CT example, the network algorithm learns the real statistics of the noise rather than using a complex approximate model of the noise. Further, if the ground truth image data is from a real high-dose clinical scan, then the ground truth data will contain some noise, allowing the network algorithm to learn to denoise an input while preserving the noise texture of the ground truth data. Preserving the noise texture provides for reconstructing natural-looking images with a higher perceived image quality.

Traditional approaches of learning a noise model may also have the drawback of tying the learned network to one particular scanner setting or dose. This makes deploying a trained network difficult in a clinical environment where doses are routinely adjusted (e.g., to adapt a dose to the patient's body mass, etc.). However, by denoising sparse image representations, the network adapts to the noise level by changing the values of thresholding applied to the coefficients in the transform domain. A transform-domain denoiser provided as an autoencoder may be expressed as:

$$\hat{x} = W'h(Wy) \qquad (3)$$

where W is a trainable convolutional decomposition operator, W' is a trainable reconstruction operator and h a sparsity inducing activation function. The number of free parameters is reduced by imposing that the reconstruction operator $W'=W^T$, which drives W towards a tight frame. By denoising sparse image representations, the trained network operates on data regardless of the scan settings and dose. The one network may be used in many different scans and patients.

FIG. 1 illustrates an example of a spare denoising autoencoder for denoising sparse image representations. Referring to FIG. 1, the denoising autoencoder 100 updates network parameters based on gradient backpropagation with respect to the mean squared error (MSE) or another loss between the reconstructed output 103 and the input 101 of the network 100.

In an example depicted in FIG. 1, input 101 is a noisy image $I_n$ and output 103 is a denoised image $I_r$. To train the denoising autoencoder 100, the input 101 is corrupted by a certain type and amount of noise, such as by a noise distribution modeled after real-world noise (e.g., modeling noise introduced during a low-dose CT scan). The uncorrupted input is used as ground truth data in a training image pair. The corrupted input 101 is mapped by decomposition block 105 to a sparse image representation using a number of trainable filter weights. The sparse image representation is thresholded to remove noise by trainable thresholding filters in thresholding block 107. The denoised sparse image representation is reconstructed by a reconstruction block 109 mapping to output 103. The output 103 is reconstructed in the same form as the input 101 based on applying the reconstruction block 109 of the same shape as decomposition block 105, resulting in denoised image $I_r$. During training, the Dictionary D of the decomposition block 105 and the thresholding functions of the thresholding block 107 are randomly initialized to better adapt the parameters of the autoencoder 100 to the given input data 101.

The decomposition block 105 is provided as an edge filter for generating the sparse image representation in a transfer domain. The filter weights of the edge filter are initialized from a random zero-mean Gaussian distribution such that the initial filter weights do not have a distinct structure and are trained to adapt specifically to the training datasets (i.e., noisy images $I_n$) as long as the loss decreases during training. Nearly all or all filter coefficients are adjusted during training, with edge structures clearly visible in the transfer domain after training.

The thresholding block 107 is provided as thresholding functions to remove noise. The thresholding functions may be provided as shrinkage functions, such as a non-negative garrote function, as will be discussed in more detail below. The shrinkage function takes the sparse representation of each input and shrinks the filter coefficients according to a noise level corresponding to the input (e.g., each input is corrupted with a different noise level, measured by the standard deviation from the ground truth). This way, the denoising network learns to adapt to various noise levels. For example, in the transfer domain, the sparse image representation includes a small set of strong coefficients corresponding to edge structures and a larger set of weaker coefficients corresponding to noise. The thresholding function sets the smaller coefficients to zero, removing noise from the sparse image representation.

Referring back to FIG. 1, the denoising autoencoder 100 is trained on patches of the noisy image $I_n$ as input 101. It follows that the decomposition block 105, thresholding block 107 and reconstruction block 109 are trained for each patch (e.g., repeats training for each patch) for a plurality of training images in an training dataset. Training the denoising autoencoder 100 with image patches results in better reconstruction of sharp edges. The tradeoff of using image patches is overemphasis of noise. For example, while training the denoising autoencoder 100 on larger patches (e.g., the entire image) results in a better noise reduction, training and processing larger patches is more computationally expensive and may be unsuitable for real-time applications. As such, to increase processing speeds, any patch size may be used with denoising autoencoder 100, such as 5 by 5.

Further, to decrease the overemphasis of noise while reducing the computational expense by using smaller patches, a multiscale transform is provided. Using neural networks that are trained in the fashion of a convolutional sparse denoising autoencoders, as discussed above, an architecture is provided with multiscale decomposition to accelerate 3D processing and to adapt to noise levels provided as a separate input for deeper learning.

Figure 2A:
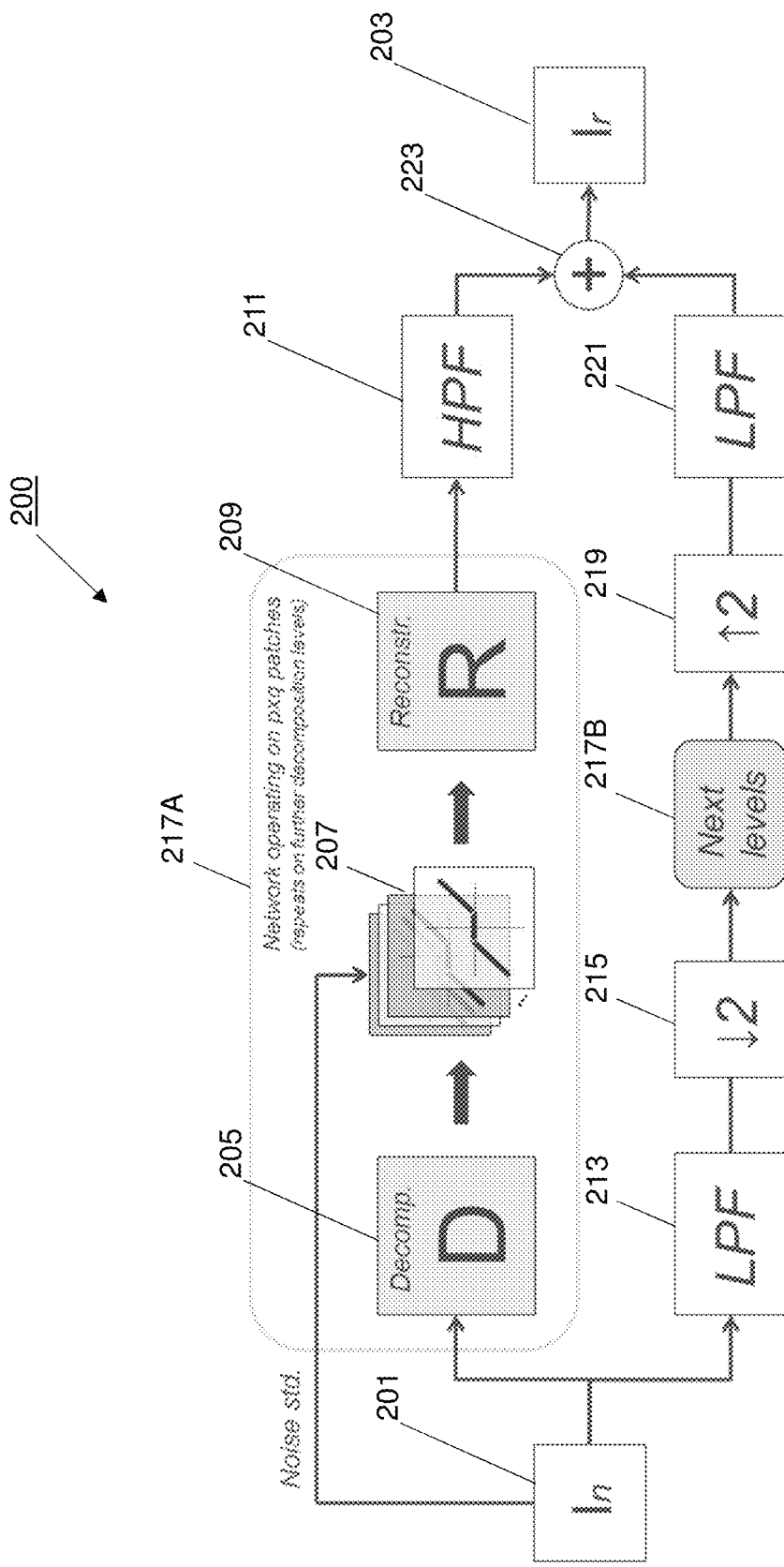
FIGS. 2A-2B illustrate example networks of multiscale denoising autoencoders.
Figure 2B:
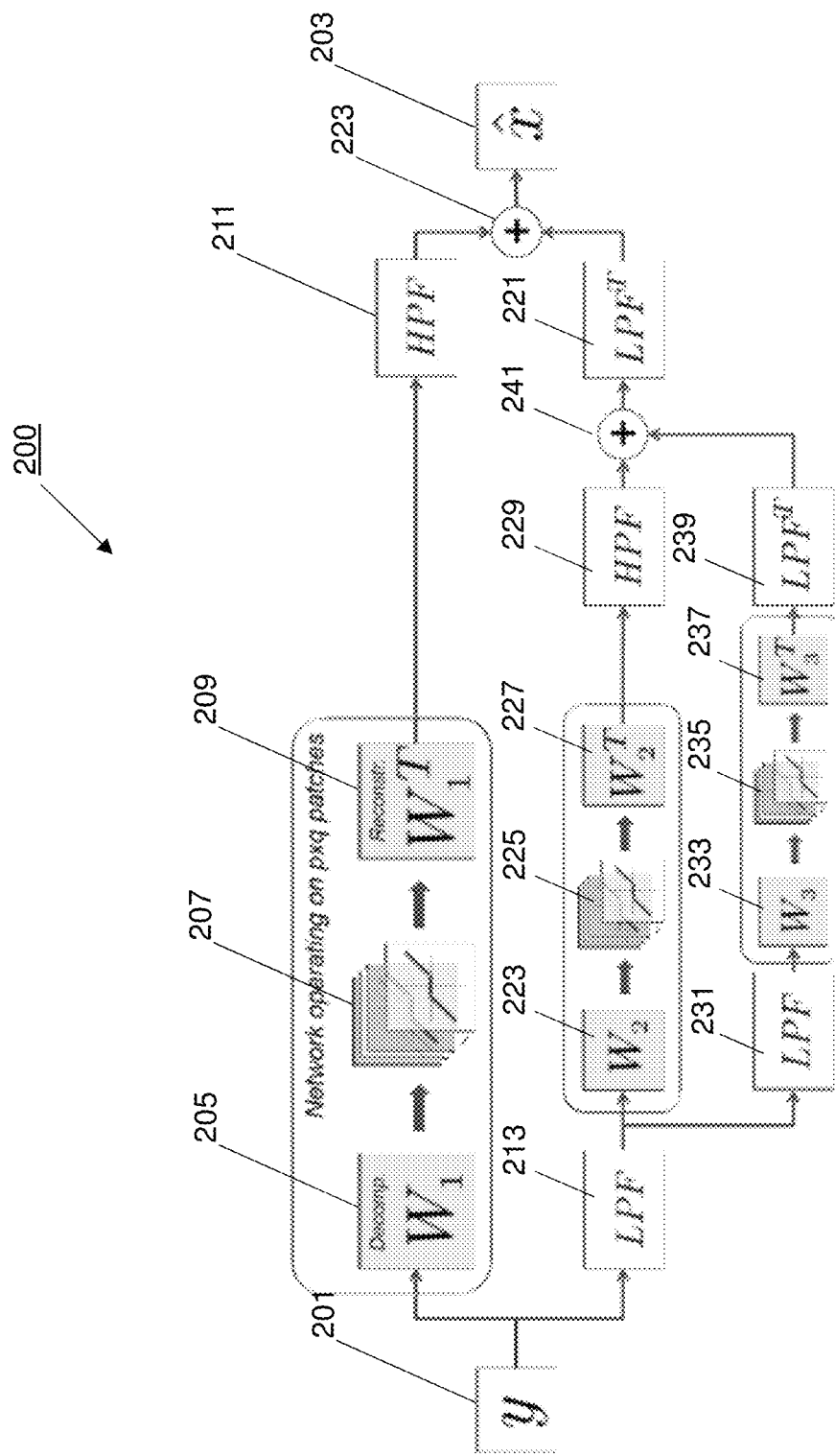

FIGS. 2A-2B illustrate example networks of multiscale denoising autoencoders. Referring to FIG. 2A, a multiscale architecture of multiple denoising autoencoders 217A is provided as network 200. Each denoising autoencoder 217A in the cascade is provided with a decomposition block 205, thresholding block 207 and reconstruction block 209 as discussed above with regards to FIG. 1. Each denoising autoencoder is independently trained on image patches of a different scale. For example, decomposition block 205, thresholding block 207 and reconstruction block 209 are provided as a first layer of the network 200. One or more additional levels of denoising autoencoders are represented in recursive block 217B. The recursive block 217B represents any number of additional denoising autoencoder levels. Each level includes a separately trained decomposition block, thresholding block and reconstruction block for a different scale.

Each level of the network 200 downsamples the image data with a low pass filter (LPF), such as by LPF 213 by a factor of two represented in block 215. Other factors may be used. For each level of subsampling, the same patch size is used, allowing the downsampled levels to denoise a larger portion of an image. An input noise level (i.e., noise std.) is provided to the thresholding blocks of each level of the multiscale architecture, allowing the network to adapt to noise levels via deeper learning by incorporating additional information into the learning process.

Due to the downsampling, the network is trained on relatively large image patches, while still using a simple sparse image representation for computational efficiency. Further, because image regions with low gradient energy may depict stronger edges in lower scales due to the downsampling, the trained filters at the various scales differ. Although sharing the filter weights between scales would further reduce the number of trainable parameters and computational complexity, not sharing the filter parameters between scales allows the different layers to adapt to each scale separately, providing more accurate denoising and image reconstructions. Likewise, the thresholding functions at each scale are also trained separately.

To generate the reconstructed output 203 (i.e., the denoised image the upscaled outputs of each scale are combined by summation block 223. The outputs of each scale are upscaled in an inverse operation as the downsampling operations. The summation block 223 is a weighted sum and is trainable by network 200. Prior to summation, the outputs of each scale are passed through additional trainable high pass and low pass filters HPF 211 and LPF 221. For example, the HPF 211 passes high spatial frequency image data denoised at the original scale, and LPF 221 passes low spatial frequency image data denoised at the original scale, after upsampling to the original scale at block 219 by the same factor as block 213.

More specifically, referring to FIG. 2B, the recursive block 217B is expanded to depict a three-level network 200 including three denoising autoencoders trained at different scales. For example, recursive block 217B is replaced by two denoising autoencoders, additional low pass filtering, and additional summation. After the input 201 is downsampled at LPF 213, the downsampled input 101 is fed into an intermediate scale autoencoder that includes a separately trainable decomposition block 223, thresholding block 225 and reconstruction block 227. The downsampled input 101 is downsampled again at LPF 231 and fed into the lowest scale autoencoder that includes another separately trainable decomposition block 233, thresholding block 235 and reconstruction block 237. An intermediate output is reconstructed by combining the intermediate and low scale outputs by summation block 241 in the same manner as discussed above. The summation block 241 is also a weighted sum and is trainable by network 200. Again, the HPF 229 passes intermediate spatial frequency image data denoised at the downsampled scale, and $LPF^T$ 239 passes the low spatial frequency image data denoised at the downsampled scale, after upsampling to the downsampled scale by the same factor as LPF 231.

Specifically, the low pass filtering is performed by low-pass wavelet decomposition performed by convolution at LPF 213 followed by further downsampling at LPF 231. The wavelet reconstruction consists of successive upsampling and transposed convolution by $LPF^T$ 239 and $LPF^T$ 221. Prior to $LPF^T$ 221, the two lower scales are summed with a trainable weighted sum 241, followed by a summation with the highest scale at trainable weighted sum 223. In absence of the thresholding function, the sum of $LPF^T$ 221 and the HPF reconstruction 211 realizes nearly perfect reconstruction.

Referring back to the example of denoising a 3D CT scan, learning the multiscale sparse image representations will be compared to traditional CT denosising. For example, traditional 2D CT denoising has been performed using filters of 17 by 17 pixels. Such large filters are prohibitively computationally expensive to apply to large 3D CT volumes sizes (e.g., at least 5123 voxels). Sparse denoising autoencoders, such as with a multiscale decomposition as shown in FIGS. 2A-2B, utilize recursive downsampling instead of the larger filter size. It is noted that applying the traditional 2D filter size to a 3D CT scan would result in a larger filter size of 17 by 17 by 17 voxels. Further, accuracy is increased over the traditional CT denoising by training each scale independently (e.g., three or more distinct learnt operators) instead of using the same or similar filter parameters at each scale.

FIG. 2C illustrates the smaller patch sizes applied at three different scales. In this example, the multiscale sparse coding network operates on the three scale levels depicted in FIG. 2C. By downsampling, the same patch size is able to operate a larger portion of the input 201, as depicted in scales 1-3 in FIG. 2C. In 3D CT example, the multiscale sparse coding network deploys three decomposition levels, such as decomposition blocks 205, 223, 233. Each sparse denoising autoencoder maps the input data to a hidden representation by using a convolutional layer in patches of 125 filter kernels (5 by 5 by 5 voxel patch in 3D). A 2D example uses 25 filter kernels (5 by 5 pixel patch in 2D). The 25 filters correspond to the elements of the decomposition operator W to learn. The obtained 25 feature maps (e.g., the representation coefficients) are then thresholded by applying a non-negative garrote function $h_{garrote}$, as will be discussed below, and reconstructed to the same shape as the input by using a transposed convolutional layer with the same dictionary filter elements (e.g., corresponding to the convolution with a filter of 25 filters of 5 by 5). On each scale level, a distinct operator of the same sized filter kernels $W_1, \ldots, W_n$ is learnt, where n denotes the number of scale levels provided. In this example, filter kernels of size 5 by 5 effectively corresponds to processing of the original sized network input with filters of size 10 by 10 on scale level 2 and with filters of size 20 by 20 on scale level 3 where the scaling factor between levels is 2.

In the embodiments discussed above, the networks are provided using only one thresholding block applied in each branch. Performance may be improved by making the network deeper by integrating interscale and interfeature correlations, while still preserving the noise level flexibility and low computational expense. In an embodiment, interscale denoising may be performed after the reconstructed output of a network 200 of multiscale denoising autoencoders.

Figure 3:
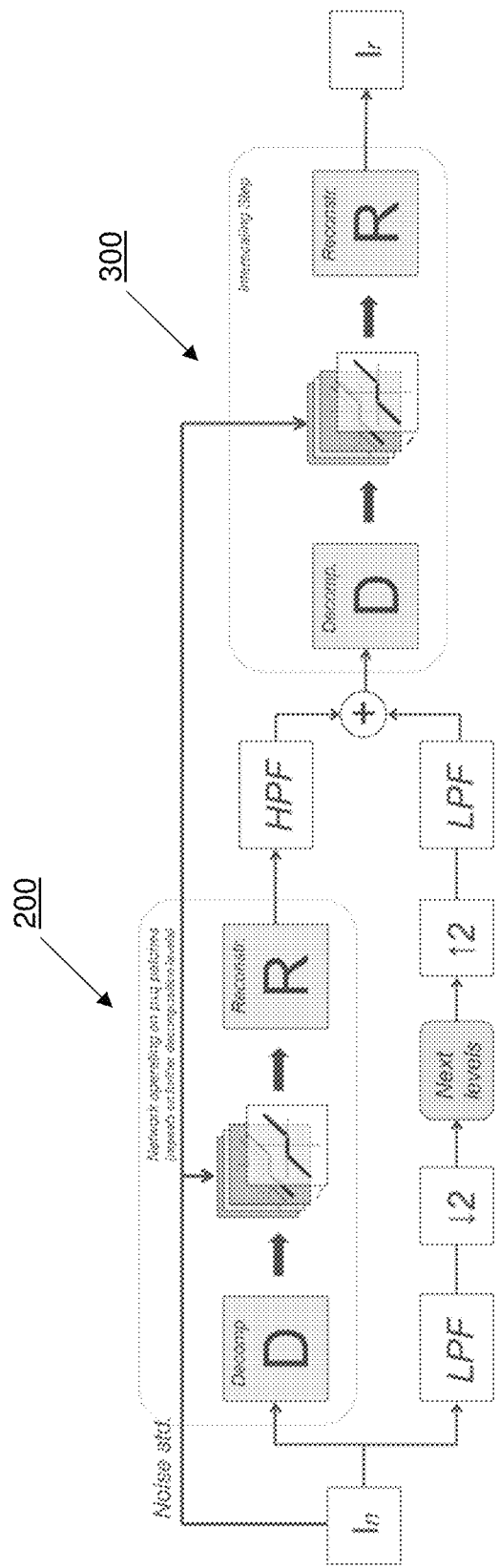
FIG. 3 illustrates interscaling after a network of multiscale denoising autoencoders.

FIG. 3 illustrates interscaling after a network of multiscale denoising autoencoders. In this example, the network 200 is extended with an additional autoencoder 300, including an additional filtering block, a thresholding block, and reconstruction block. The additional autoencoder 300 applies a thresholding block between the different scales (e.g., interscaling) based on the summed output of the network 200. The additional thresholding functions again denoise based on the input noise level and by learning an appropriate scale for the interscaling.

Figure 4:
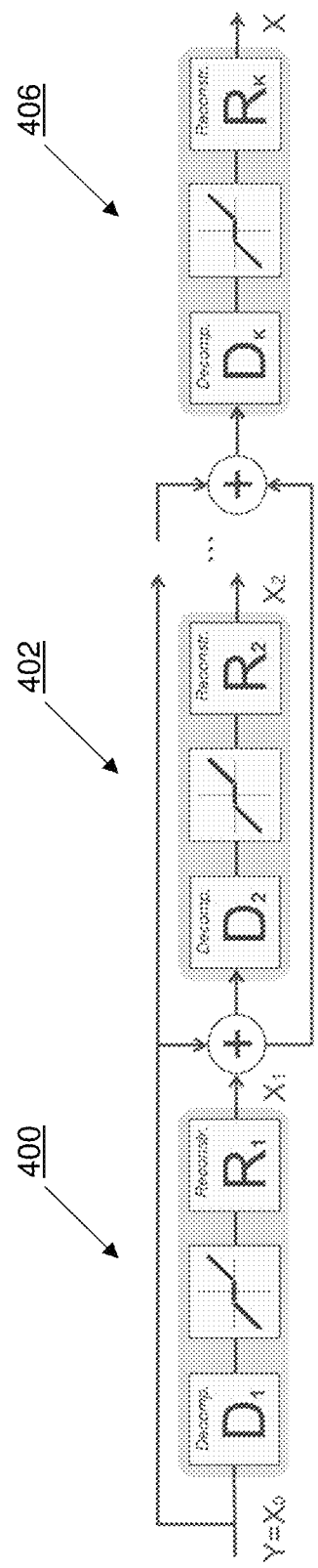
FIG. 4 illustrates an example of learning sparse image representations with deep unfolding.

Additionally, the networks discussed above in FIGS. 1-3 may be trained in a deep network by stacking the multiple layers in a chain using a deep unfolding approach. Unfolding refers to replacing a set number of cycles or iterations of an algorithm with a finite structure. FIG. 4 illustrates an example of learning sparse image representations with deep unfolding. FIG. 4 depicts three iterations or cycles of a network of multiscale autoencoders unfolded into a feed-forward network. Three autoencoders layers are depicted in a feed-forward network connected with weighted averaging performed between the layers. For example, the architecture for each iteration 400, 402, 406 corresponds to a layer of a neural network, such as the network 200 of the multiscale denoising autoencoders depicted in FIG. 2B. In an example, the first iteration 400 corresponds to a layer the network 200 at the lowest scale (decomposition, thresholding and reconstruction blocks 233, 235, 237), the second iteration 402 corresponds to a layer of the network 200 at the intermediate scale (decomposition, thresholding and reconstruction blocks 223, 225, 227), and the third iteration 406 corresponds to a layer of the network 200 at the highest scale (decomposition, thresholding and reconstruction blocks 205, 207, 209). The weighted sum or recombination after each layer is computed between the weighted output of the previous network layer, the weighted output of the current network layer and the weighted noisy input to the whole network.

Image denoising is greatly improved using sparse image representation-based denoising algorithms formulated as an unfolded feed-forward neural network. As discussed above, by training with a randomly initialized dictionary and randomly initialized thresholding functions allow the network to better learn denoising parameters for the given data. In the 3D CT data example, the denoising algorithms are unfolding into a feed-forward network. To run as few iterations as possible (e.g., realize convergence after n=3 iterations rather than ∞), the n iterations are unfolded into a feed-forward network, as depicted in FIG. 4. The feed-forward network is then trained to optimize thresholds and weights individually for each iteration. The trained feed-forward network may be applied to new CT scans as a trained convolutional neural network (CNN).

Figure 5:
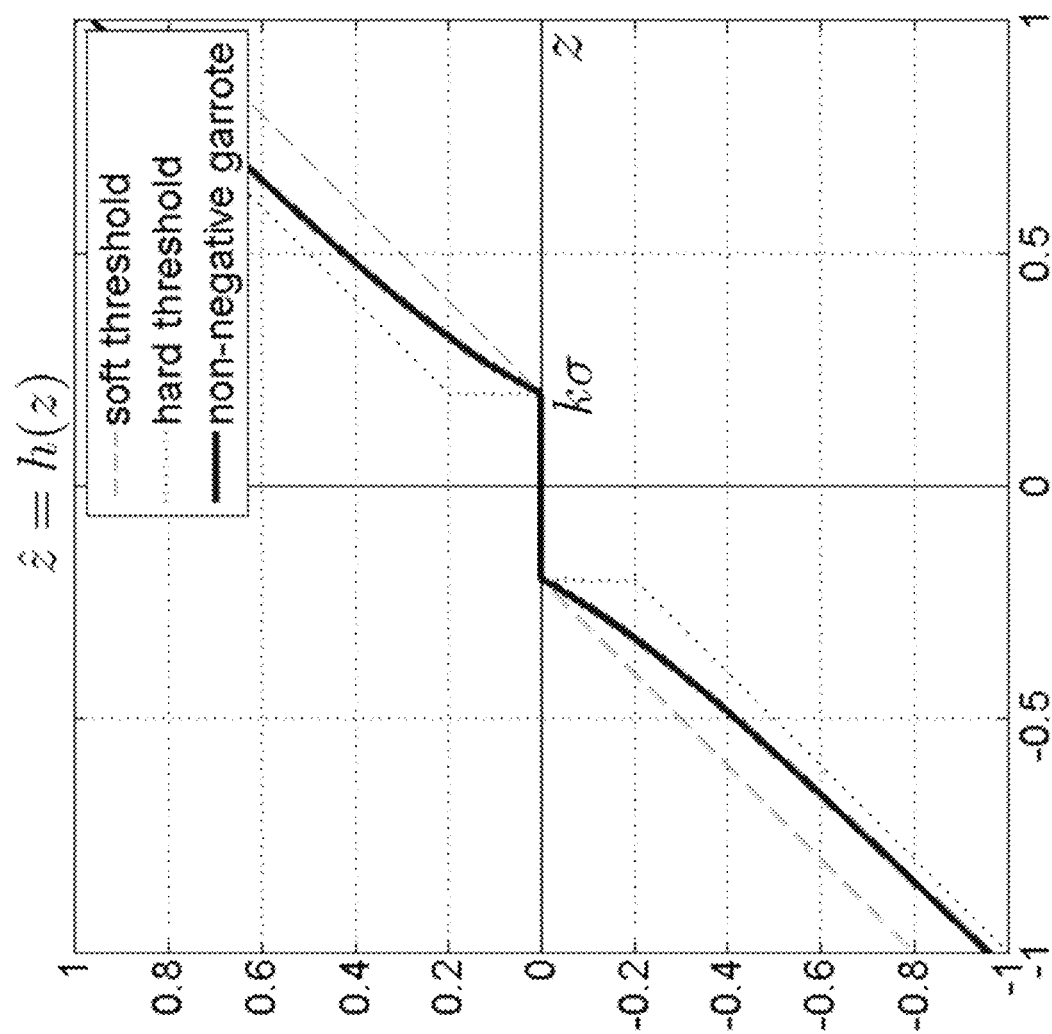
FIG. 5 illustrates an example of a Garrote thresholding function.

FIG. 5 illustrates an example of a Garrote thresholding function. For the embodiments discussed herein, the thresholding function may be provided as a Garrote function using an empirical Wiener filter (i.e., a Wiener-like filter without knowing the target variance). FIG. 5 illustrates a plot of a non-negative garrote function used for thresholding the sparse image representation coefficients. FIG. 5 also illustrates soft and hard thresholding functions, which may be used in other embodiments. The thresholding function is applied based on the observation that, given the sparse image representation of the noisy image data, a large number of small coefficients will exist mainly due to noise and fewer large coefficients represent the main image features (e.g., edges, etc.). By setting the small coefficients to zero during thresholding, the image data is denoised. For example, in the feed-forward neural network depicted in FIG. 4, a separately trained thresholding function for the architectures each iteration 400, 402, 406 sets the small transform coefficients to zero and keeps the large transform coefficients, resulting a denoised X estimate of the input $X_0$.

The non-negative garrote function, as depicted in FIG. 5, may overcome the disadvantages of the soft and hard thresholding functions. For example, the soft thresholding shrinkage comes with a bigger bias due to the shrinkage of large coefficients, and the hard thresholding shrinkage is not continuous, thus is incompatible with training by backpropagation. The non-negative garrote function is dependent on the noise level $\sigma$ and a thresholding level k, and forces sparsity on each representation transform coefficient $z_j$ by:

$$\hat{z}_j = h_{garrote}(z_j) = \frac{(z_j^2 - k\sigma^2)_+}{z_j}, \qquad (4)$$

in to obtain the thresholded coefficients $\hat{z}_j$. The positive part function + is defined as:

$$x_+ = \max(x,0) \qquad (5)$$

The noise variance $\sigma^2$ is an input to the network, enabling training and testing at multiple dose settings, and the thresholding value k is a trainable parameter. Its initial value should be chosen very small to avoid starting the training in the flat region around 0 where backpropagation would fail to generate gradients. By applying the non-negative garrote function, the use of neural networks to learn a sparse representation for image data and application of the trained thresholding functions provide for denoised estimates of the clean image data to be reconstructed and displayed. Further, by introducing the learnable threshold value proportional to the input noise level, the network adapts to different doses administered during scanning.

Figure 6:
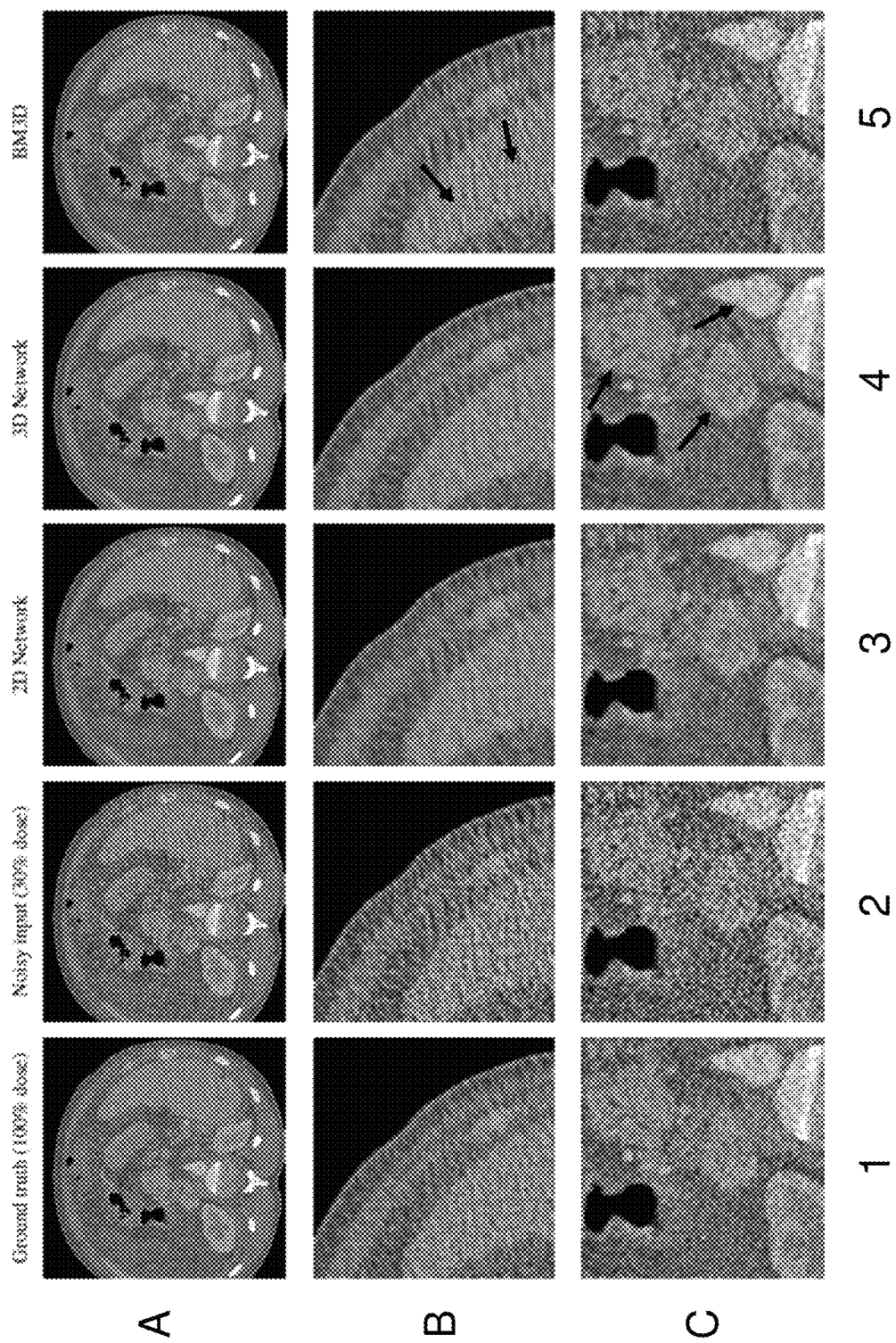
FIG. 6 illustrates an example of the results of applying a trained network.

FIG. 6 illustrates an example of the results of applying a trained network as discussed above. For example, FIG. 6 shows that networks trained for denoising CT datasets with multiscale sparse image representations do not introduce noticeable texture artifacts that are introduced by previous denoising approaches (e.g., the prior art BM3D method, as discussed in the background above). Specifically, rows A, B and C depict different images captured using a CT scanner. Column 1 depicts ground truth data for training and evaluation. The ground truth data is captured using a high dose scan (e.g., a 100% dose), resulting in a high signal-to-noise (SNR) ratio. Column 2 depicts a lower dose scan (e.g., 30% dose), resulting in a noisy input with a lower SNR ratio. In an example, the low dose is simulated using the raw high dose scan and introducing noise into the image based on the characteristics of the imaging modality (e.g., Poisson's noise, or the like). The multiscale network is able to learn a sparse image mapping from the artificially corrupted to high-dose imaging data without need of prior information about underlying noise models of the given data.

The goal of effective denoising algorithms is to reconstruct sharp edges of organ boundaries, medical instruments and other objects, as the reconstructed edges often provide the most useful information to the physician regarding the patient. A further goal of effective denoising algorithms is to avoid introducing artifacts into the image data, such as ringing effects along edges, splotchy artifacts or other artificial structures. Image artifacts are especially undesirable because the artifacts may impede a physician's ability to make a correct diagnosis or decisions based on the reconstructed image. FIG. 6 depicts the results of applying both a 2D and 3D multiscale sparse coding networks for denoising synthetically corrupted CT slices/volumes. Specifically, columns 3, 4 and 5 depict the results of applying a 2D multiscale network (e.g., FIG. 4), a 3D multiscale network (e.g., FIG. 4) and the prior art BM3D method, respectively. Comparing the results of the 2D/3D multiscale networks and the prior art BM3D approach, the multiscale networks result in reconstructed images with sharper edges and with less artifacts. Referring to row C, column 4, arrows show more conspicuous boundaries/edges reconstructed by the 3D multiscale network. Further, in row B, column 5, arrows show texture artifacts produced by the prior art BM3D approach (i.e., vertical streak artifacts) that are not present in the images reconstructed by the 2D/3D multiscale networks (columns 3 and 4).

Figure 7A:
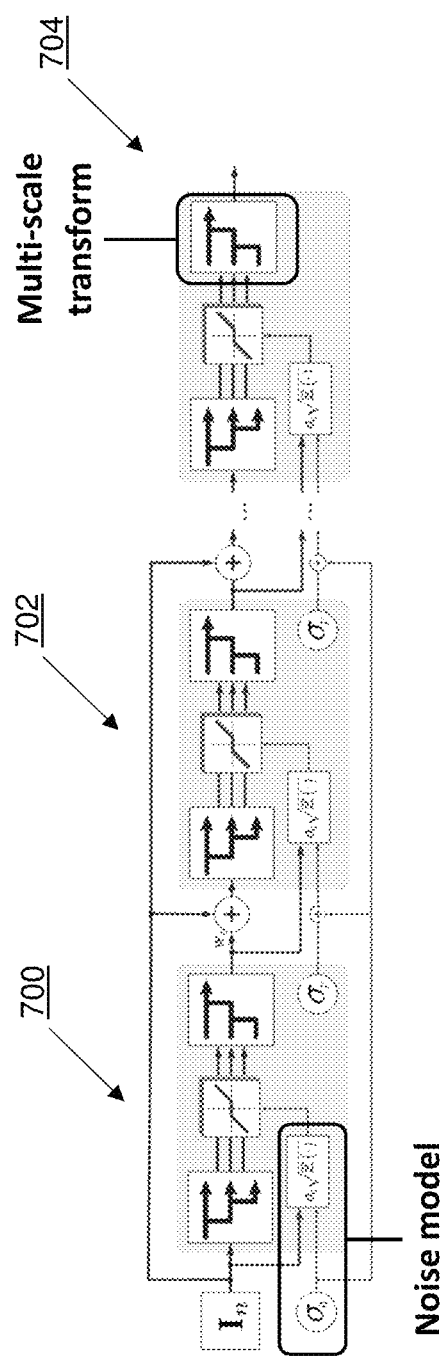
FIG. 7A illustrates a network of autoencoders trained with a noise model.

In additional embodiments building upon the above disclosure, the networks may be trained using an additional noise model for the imaging modality. FIG. 7A illustrates a network of autoencoders trained with a noise model. FIG. 7A illustrates three autoencoders 700, 702, 704 of a feed forward network with weighted averaging between each autoencoder. Additional iterations may be included. As depicted in FIG. 7A, a noise model is included as an input to each of the thresholding blocks of the network of autoencoders. For example, once the trained network is deployed, the dose settings may be changed from scan to scan. By including the noise model during training, the autoencoders are trained to be noise aware, learning denoising parameters based on the scan dose of the training datasets. As such, the noise model is provided as an input for deeper learning. The noise model may be provided as Poisson's noise, based on the real-world physics of the scanner. Other noise models may be used, such as Gaussian noise and/or input scan and dose settings.

Figure 7B:
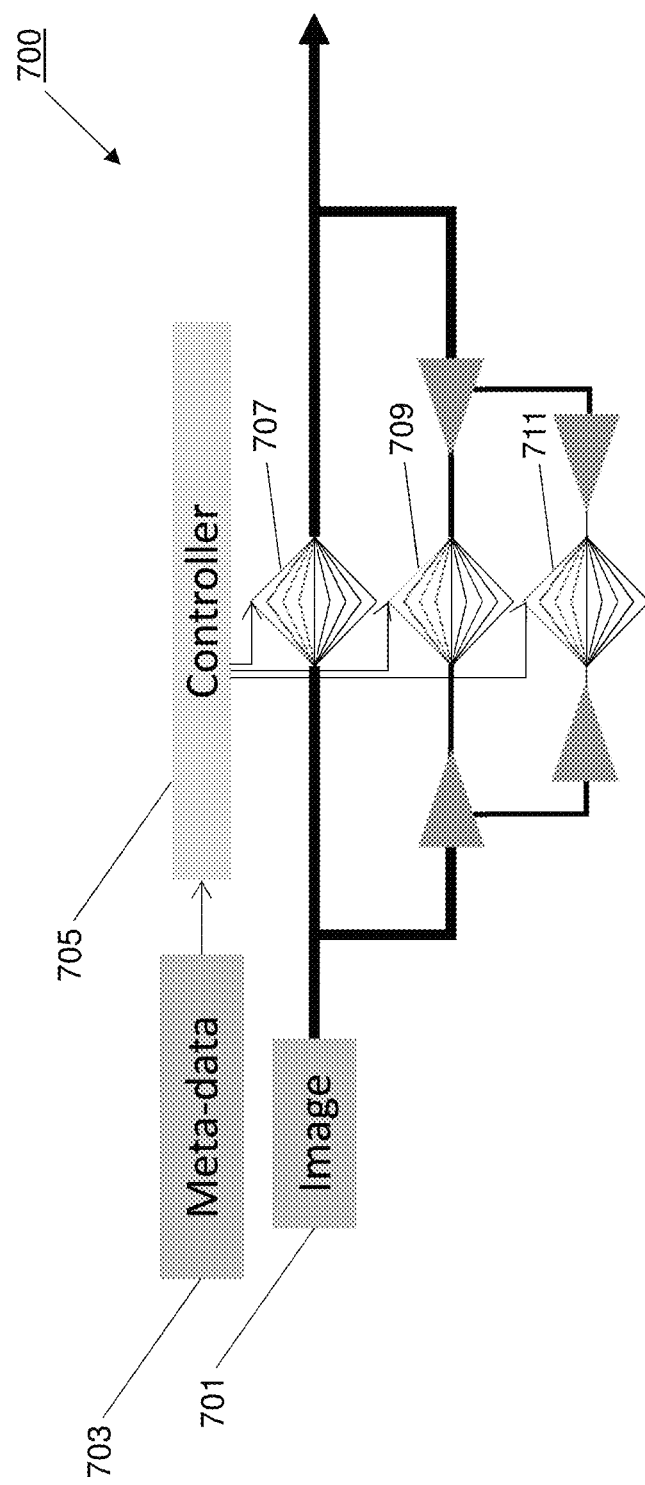
FIG. 7B illustrates deep learning controller network trained with image acquisition metadata.

In further embodiments, the networks may be trained using scan specific metadata for the input image dataset. FIG. 7B illustrates a deep learning controller network trained with image acquisition metadata, such as scan settings including dose or x-ray source voltage. FIG. 7B depicts a multiscale deep neural network, with each layer trained based on input image data and scan metadata. In this example, the multiscale deep neural network provides deeper learning allowing the network to adapt to different scan parameters. For example, the deeper learning provides for addition of a fully connected controller network 707, 709, 711 in place of each autoencoder (e.g., as depicted in FIG. 2B). In the example depicted in FIG. 7B, the network outputs thresholds for each filter (e.g., 75 trained filters, with 25 filters for each of the three scales). The inputs for the fully connected controller network 705 include three image reconstruction kernel parameters (e.g., rho50, rho10 and rho2) and the dose level. The inputs may also include scanner geometry, through plane, slice size, slice spacing and/or other scanner metadata. Additional or different inputs may be provided for deeper learning, improving adaptability to a wider range of imaging parameters, such as the tube voltage (e.g., affecting image contrast), region-of-interest, reconstruction resolution and reconstruction kernel (e.g., affecting the noise texture.)

Figure 8:
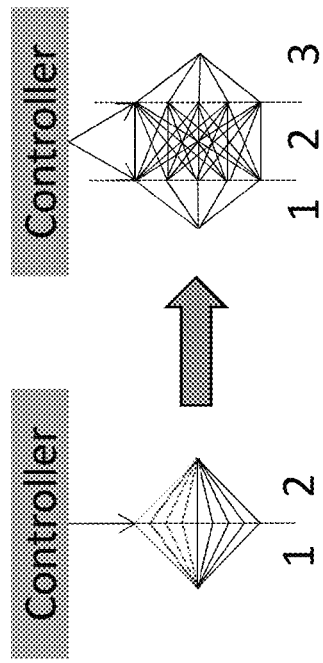
FIG. 8 illustrates an example of deeper learning for a fully connected controller network.

In embodiments for training networks with or without the additional noise model for imaging modality deployed and scan specific metadata for the input image dataset as discussed above with respect to FIGS. 7A-7B, deeper learning may be provided. FIG. 8 illustrates an example of deeper learning for a fully connected controller network. In this example, a deeper network is provided by learning additional features in additional transform domains prior to reconstructing the denoised image data at each scale. For example, the left side of FIG. 8 depicts an autoencoder transforming noisy input 1 to output 2 with one layer in the transform domain. The right side of FIG. 8 depicts a deeper network for transforming noisy input 1 to output 3 with an additional layer 3 in the transform domain. More layers may be provided in the transform domain. The additional layers of transform domains increases learning capability of the network. In the example depicted in FIG. 8, the controller learns the thresholds at a second layer. In this example, the network learns 25 features at each layer, therefore the second layer doubles the learning capabilities of the network. Adding additional layers for deeper learning also improves the abilities of the network to adapt to different scan does.

Figure 9:
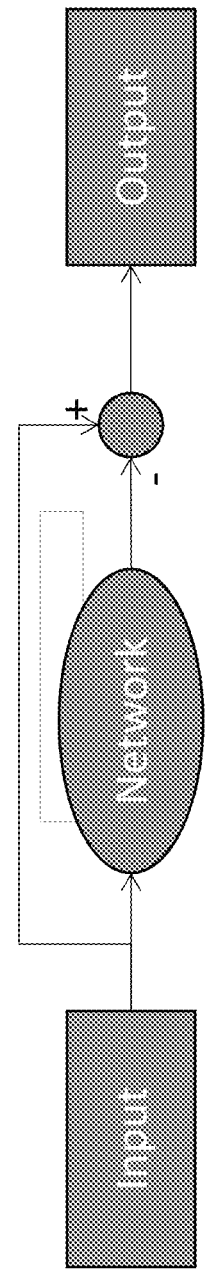
FIG. 9 illustrates an example of a network trained on the residual correction.

Each of the aforementioned embodiments may be provided as a network trained on residual correction, as depicted in FIG. 9. In this example, the network is trained on the correction to the image data rather than on image data directly. In other words, instead of training the network to reconstruct the output of the image data directly, the network is trained to reconstruct the noise to be removed from the image data. No training is needed to reconstruct image data if there is no noise in the dataset. Further, training on the correction may provide for faster training.

Figure 10:
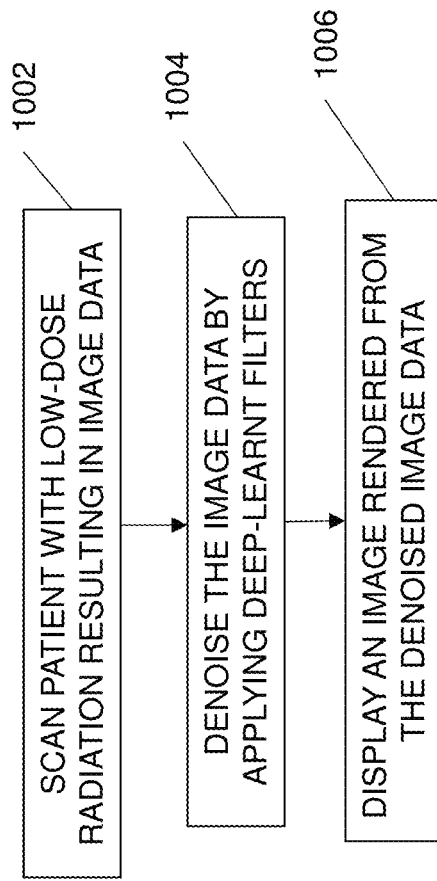
FIG. 10 illustrates one embodiment of a method for denoising medical images in a computed tomography (CT) system.

FIG. 10 illustrates a method for denoising medical images in a computed tomography (CT) system. The method is implemented by the system of FIG. 12 (discussed below) and/or a different system. Additional, different or fewer acts may be provided.

At act 1002, a patient is scanned by a CT system to generate CT image data. The CT scan is performed with a radiation dose resulting in noise in the CT image data. The CT scan may be a 2D or 3D CT scan, such as during an interventional surgical procedure captured with different scan settings and doses.

At act 1004, the CT image data is denoised by an image processor. The image processor applies a deep-learnt multiscale network of filters for decomposing the CT image data into sparse image representations at multiple scales. The deep-learnt multiscale network of filters is provided as a trained cascade of sparse denoising autoencoders or other deep learning networks. The lower levels of the deep-learnt multiscale network apply learnt filters to image data recursively downsampled from the CT image with respect to previous levels of the deep-learnt multiscale neural network.

The filters were randomly initialized prior to training and trained independently. Further, thresholding values of the sparse denoising autoencoders were adaptively learned independently at each scale. In an example, filter weights of the filters were initialized with a random zero-mean Gaussian distribution, providing no distinct structure for better adaptation of the filter weights to training datasets. Independent learning allowed for the parameters to be optimally adapted to training datasets at each scale. Further, the filters were trained with patches at each scale.

The denoising learnt filter maps the patch of the CT image data from the patient to sparse image representations, wherein the sparse image representations are thresholded by a thresholding function to remove noise. As such, each autoencoder includes a separately trained decomposition filter for transforming an input to a sparse representation at different scales, a separately trained thresholding function for each scale to remove noise from the sparse representations, and a corresponding reconstruction block for reconstructing a clean version of the input. The autoencoders may receive a concatenation of CT pixel data and metadata of the CT system as inputs.

At act 1006, an image is rendered from the denoised CT image data and displayed to a user. Acts 1002, 1004 and 1006 may be repeated to update a displayed image in real-time during a surgical procedure.

Figure 11:
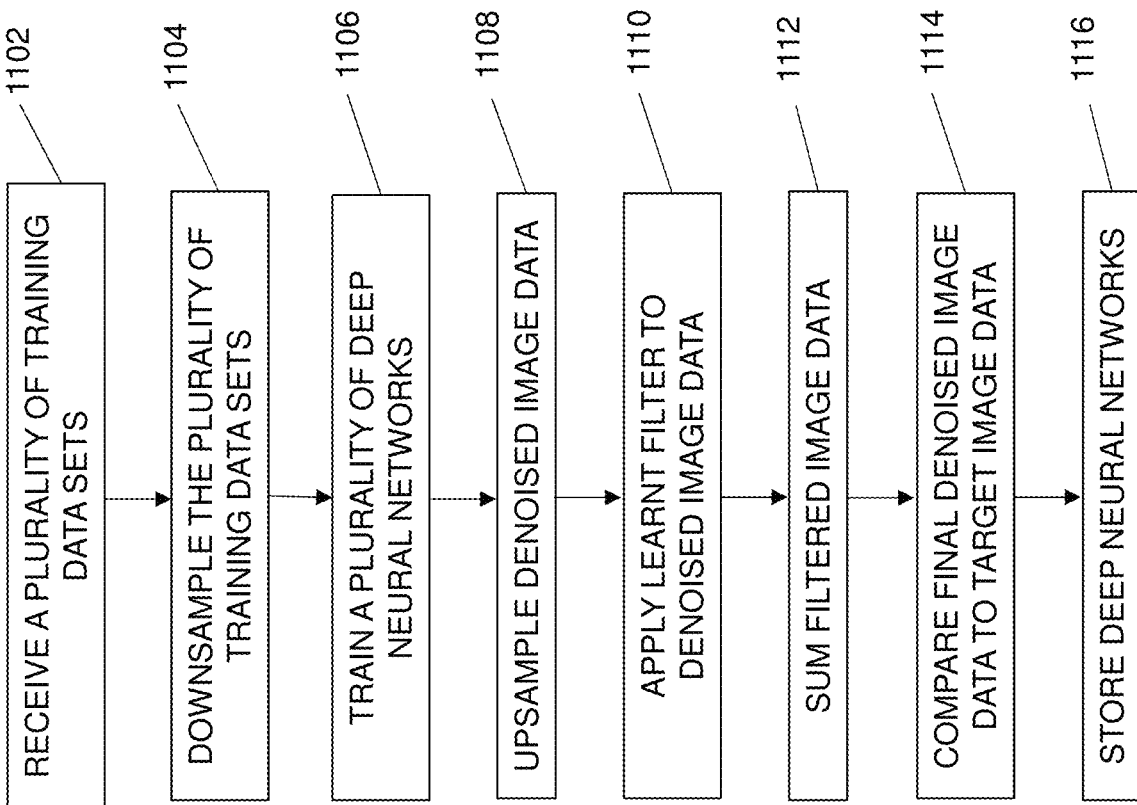
FIG. 11 illustrates one embodiment of a method for training a deep-learning based network for denoising medical images with multiscale sparse image representations.

FIG. 11 illustrates a method for training a deep-learning based network for denoising medical images with multiscale sparse image representations. The method is implemented by the system of FIG. 12 (discussed below) and/or a different system. Additional, different or fewer acts may be provided.

At act 1102, a plurality of training image data sets are received by an image processor at a first scale. The training image data sets include data capture with different scan settings and doses. For example, the training image data sets are a database of high-dose CT or MR scans. Synthetic noise introduced to simulate a corresponding low-dose is added to a copy of the image data sets. One copy without the added noise is used a ground truth.

At act 1104, the plurality of training data sets with noise are downsampled by the image processor into a plurality of training image data sets at a second scale and into a plurality of training image data sets a third scale. For example, downsampling reduces the scale by a factor of two, such as a first scale of 512, a second scale of 256, a third scale of 128, etc. Other numbers of scales, factors and downsampling may be used.

At act 1106, the image processor independently trains a first deep neural network with the plurality of training image data sets at the first scale, a second deep neural network with the plurality of training image data sets at the second scale, and a third deep neural network with the plurality of training image data sets at the third scale to collectively denoise a test image using multiscale sparse image representations. For example, parameters of the deep neural networks are randomly initialized prior to training. In one embodiment, the third/lowest scale is trained first, followed by the second/intermediate scale and finally the third/highest scale. In this embodiment, second and third scales are trained based on upscaling from the lower scales. Alternatively, in another embodiment, the three scales are trained in parallel. Further, in various embodiments, the deep neural networks each include multiple layers of deep learning, including multiple layers of feature decomposition for each network. In an embodiment, the deep neural networks are trained to learn noise corrections for the training image data sets, rather than to learn the noise coefficients.

At act 1108, the image processor upsamples the denoised image data obtained at the second scale and the third scale. For example, the denoised image data is upsampled back to the first scale.

At act 1110, the image processor applies a learnt linear filter to the denoised image data obtained at the first scale and the denoised image data upsampled from the second and third scales. For example, a high-pass filter is applied to the image data obtained at the first and second scales, and a low-pass filter is applied to the image data obtained at the third scale. Other filters may be used, such as a low-pass filter applied to the image data obtained at the second scale.

At act 1112, the image processor sums the filtered denoised data to obtain final denoised image data. The summation is a learnt weighted sum. Other summations may be used. For example, the denoised image data from the second and third scales may be summed prior to summation with the first scale, such as after applying a low-pass filter to the summed image data from the second and third scales.

At act 1114, the image processor compares the final denoised image with target image data to update weights of the deep neural networks. For example, the weights are updated using backpropagation. Further, all weights of the neural networks may be updated based on the comparison.

At act 1116, the trained deep neural networks are stored by the image processor in a memory.

Figure 12:
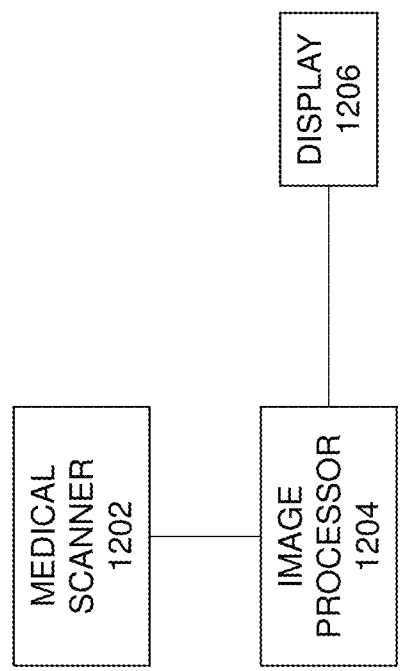
FIG. 12 illustrates a block diagram of an example of a system for denoising medical images.

FIG. 12 illustrates a block diagram of an example of a system for denoising medical images. The system includes a medical scanner 1202, an image processor 1204, and a display 1206. The image processor 1204 and/or the display 1206 are part of the medical scanner 1202. Alternatively, the image processor 1204 and/or the display 1202 are part of a workstation, server, or computer, such as connected through a computer network to the medical scanner 1202.

The medical scanner 1202 is configured to scan a patient. The scanner 1202 includes controllers, pulse generators, a radio frequency system, and coils for CT, MR or other scanning modalities. The medical scanner is configured to generate a two-dimensional or three-dimensional scan of the patient.

The image processor 1204 is a general processor, digital signal processor, three-dimensional data processor, graphics processing unit, application specific integrated circuit, field programmable gate array, digital circuit, analog circuit, combinations thereof, or other now known or later developed device for image denoising and reconstruction. The image processor 1204 is a single device, a plurality of devices, or a network. For implementations using more than one device, parallel or sequential division of processing may be used. Different devices making up the processor 1204 may perform different functions, such as denoising performed by one device and reconstruction performed by another device. In an embodiment, the image processor 1204 is a control processor or other processor of the medical scanner 1202. The image processor 1204 operates pursuant to stored instructions to perform various acts described herein. The image processor 1204 is configured by hardware, firmware, and/or software.

The image processor 1204 is configured to denoise the image of the patient with a machine-learnt network using multiscale sparse image representations. The multiscale sparse image representations are generated using parameters that were trained with layers of sparse denoising autoencoders on image data at different resolutions. The layers of the sparse denoising autoencoders were unfolded and trained independently in a feed forward network. In embodiments for denoising 3D scans, the decomposition filters of the sparse denoising autoencoders are three-dimensional filters. The image processor 1204 may have also been trained with deeper learning, such as using a receive noise level of the scanner or other metadata for the scan as an input for training.

The display 1206 is a CRT, LCD, plasma, projector, printer, or other display device. The display 1206 configured to display the denoised image of the patient after denoising and reconstruction.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for denoising medical images in a computed tomography (CT) system, the method comprising:
    scanning, by the CT system, a patient to generate CT image data;
    denoising, by an image processor, the CT image data by applying a deep-learnt multiscale network of filters decomposing the CT image data into sparse image representations at multiple scales, the deep-learnt multiscale network of filters comprising a cascade of trained sparse denoising autoencoders, wherein lower levels of the deep-learnt multiscale network apply learnt filters to image data recursively downsampled from the CT image data and resulting denoised image data at each scale is upsampled back to full resolution and summed to obtain a final denoised image CT data set, and wherein inputs to the sparse denoising autoencoders were a concatenation of CT pixel data and metadata of the CT system; and
    displaying, by a display, an image rendered from the final denoised CT image data set.

2. The method of claim 1 wherein the filters trained by the cascade of sparse denoising autoencoders were randomly initialized and trained jointly and end-to-end to optimize a quality of the denoised image data.

3. The method of claim 1 wherein filter weights of the filters are initialized with a random zero-mean Gaussian distribution.

4. The method of claim 1 wherein the filters trained by the cascade of sparse denoising autoencoders were trained with image data patches.

5. The method of claim 4 wherein denoising is repeated for patches of the CT image data at each scale.

6. The method of claim 5 wherein denoising learnt filter maps the patch of the CT image data to sparse image representations, wherein the sparse image representations are thresholded to remove noise.

7. The method of claim 6 wherein a threshold for the thresholding is a function of the metadata.

8. The method of claim 1 wherein the sparse denoising autoencoders were trained with a noise model directly related to a radiation dose of the CT system.

9. The method of claim 1 wherein the metadata of the CT system comprises a dose, a reconstruction resolution and a reconstruction kernel.

* * * * *